United States Patent [19]

Sandford et al.

[11] Patent Number: 5,515,756
[45] Date of Patent: May 14, 1996

[54] ROLLER CUTTER MODULE WITH FORCE EQUALIZER

[75] Inventors: William E. Sandford, Camino; Henry Astle, Rancho Cordova, both of Calif.

[73] Assignee: Tri Tool Inc., Cordova, Calif.

[21] Appl. No.: 222,958

[22] Filed: Apr. 5, 1994

[51] Int. Cl.⁶ .................................................. B23D 21/04
[52] U.S. Cl. .................................... 82/54; 82/84; 82/100; 82/113
[58] Field of Search .................................. 82/56, 57, 58, 82/59, 70.2, 76, 84, 86, 88, 92, 94–97, 99.1, 100, 101, 113; 30/94–102; 83/54

[56] References Cited

U.S. PATENT DOCUMENTS

| | | | |
|---|---|---|---|
| D. 309,563 | 7/1990 | Astle | D8/60 |
| 1,864,903 | 6/1932 | Gora . | |
| 3,850,058 | 11/1974 | Bachmann . | |
| 3,939,561 | 2/1976 | Nichols . | |
| 4,126,064 | 11/1978 | Tarrant . | |
| 4,227,431 | 10/1980 | Wells . | |
| 4,302,958 | 12/1981 | Andriessen et al. | 82/56 |
| 4,402,136 | 9/1983 | Rast | 30/101 |
| 4,418,591 | 12/1983 | Astle . | |
| 4,802,278 | 2/1989 | Vanderpol et al. | 82/72 |
| 4,829,860 | 5/1989 | Vanderpol et al. | 82/113 |
| 4,890,385 | 1/1990 | Vanderpol et al. | 30/101 |

FOREIGN PATENT DOCUMENTS

| | | | |
|---|---|---|---|
| 14991 | 2/1977 | Japan | 82/113 |
| 603506 | 4/1978 | U.S.S.R. | 82/113 |

*Primary Examiner*—Maurina T. Rachuba
*Assistant Examiner*—Kenneth J. Hansen
*Attorney, Agent, or Firm*—Bacon & Thomas

[57] ABSTRACT

A roller cutter module for use with a rotatable tool carrier head of a lathe machine tool includes multiple opposed cutter wheels for transversely cutting tubular workpieces, and wherein the wheels are rotatably mounted upon support arms that are pivotally attached to a support plate that is attached to the tool carrier head. An actuating system carried by the support plate pivots the support arms so as to cause the cutter wheels to be fed radially inwardly to sever a workpiece. The actuating system includes a linkage assembly which cooperates with the support plate to enable equalization of the cutting forces applied by the opposed cutter wheels to an out-of-round workpiece. The cutter wheels are mounted on the support arms so as to biased against spring elements in an axial direction to track a cutting centerline axially away from the support plate.

12 Claims, 4 Drawing Sheets

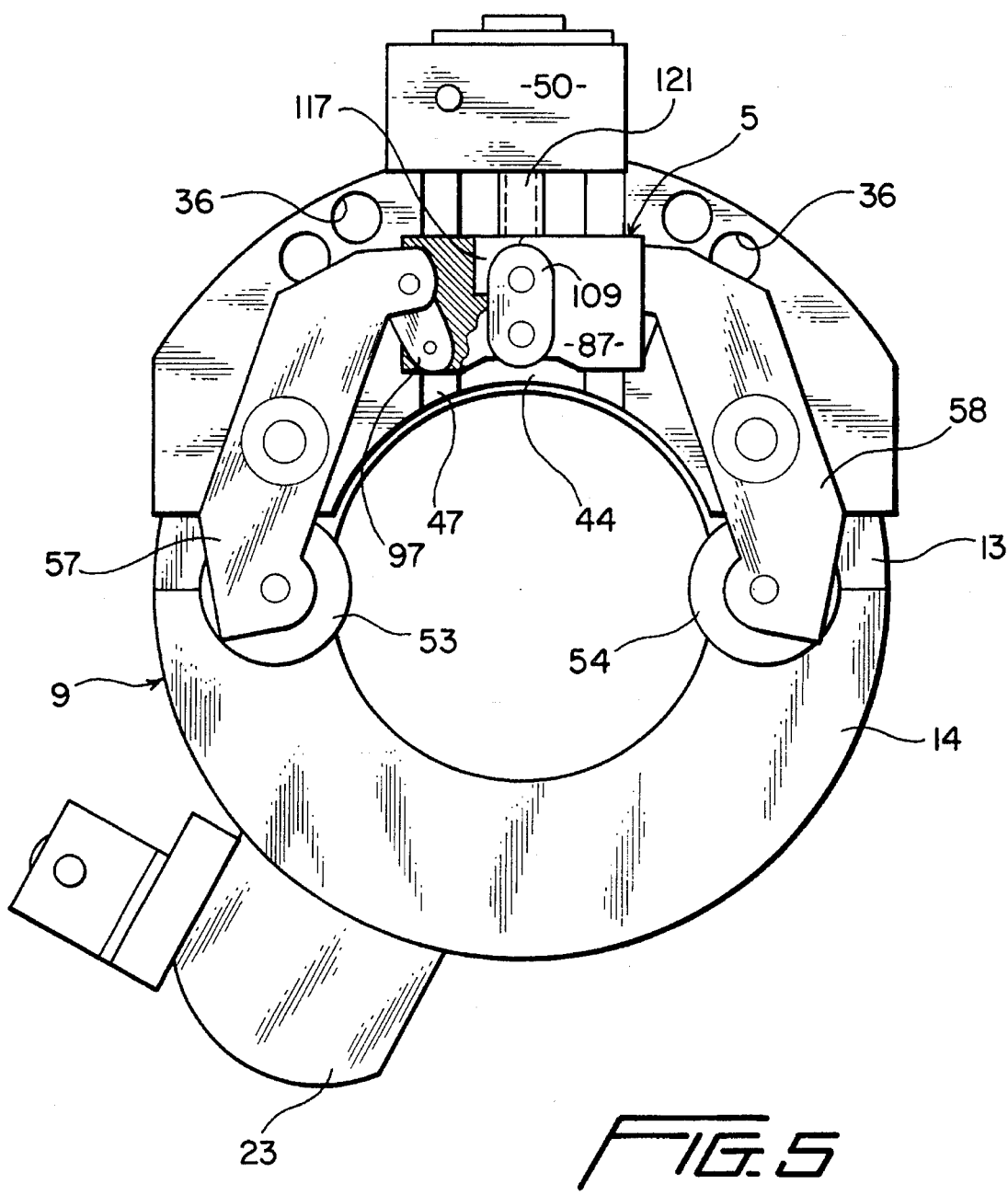

ROLLER CUTTER MODULE WITH FORCE EQUALIZER

BACKGROUND OF THE INVENTION

1. Field of the Invention

The present invention pertains to the art of metal cutting machine tools and, more particularly, to a roller cutter module adapted for use with a lathe type tool, i.e., a portable lathe, for cutting pipes or other tubular workpieces.

2. Background of the Invention

Conventional pipe and tube cutters employ tool bits that literally cut through the side wall of the workpiece material producing a chip much in the same manner as a lathe produces a chip during turning of a workpiece. Other cutters for pipes and tubular workpieces known as roller, chipless or metal displacement cutters are also known, these achieving their cutting function by forceful parting or displacement of the sidewall material of the workpiece through intense, concentrated pressure applied to a cutting line that circumscribes the workpiece. It is conventional to employ hardened circular cutters generally called cutter wheels for this purpose, with the cutter wheels attached to an appropriate mechanism for driving the wheels into the workpiece sidewall and around the periphery of the workpiece so that the workpiece material is progressively displaced and deformed until the cutter wheels progress entirely through the sidewall material of the workpiece.

The present invention is concerned with a roller type cutoff system for tubular workpieces incorporating cutter wheels that are driven about the periphery of the workpiece by a mechanism that drives the cutter wheels around the workpiece while they are forcibly fed into the workpiece material until the workpiece is entirely severed.

Prior art roller type cutters are known which can be attached to the rotating head of a lathe or other driving tool for severing pipes and tubular workpieces having generally thick sidewalls, wherein the tooling system includes means for driving the cutter wheels around the periphery of the workpiece and into the workpiece material itself in an automatic manner much in the same manner as a cutter tool bit. It is known, in such systems, that metal displacement will proceed until approximately 30–50% of the sidewall material of the workpiece has been penetrated by the cutter wheels. Provided that the workpiece is not axially restrained on both sides of the cutting plane of the cutter wheels, the force exerted by the cutting wheels against the adjacent sidewall material on either side of the cutting groove will exceed the tensile strength of the remaining uncut sidewall material beneath the cutter wheels resulting in the slight axial displacement of the workpiece located towards the free end of the plane in which the cutter wheels rotate. It is known to provide a compensating system whereby undue lateral pressure against the cutter wheels is avoided as a result of such distention of the workpiece whereby the cutting plane of the cutter wheels may shift slightly to follow the distention of the workpiece.

A particular problem exists in connection with the use of diametrically paired cutter wheels that are radially fed into the workpiece during a cutting operation wherein the workpiece is not perfectly circular in cross-section. It can be appreciated that, when such an out-of-round condition is encounted, the automatic feeding of the cutters into the workpiece results in one or the other of the cutter wheels and their associated support structures to be unduly stressed in an eccentric manner. That is, one of the cutter wheels and its associated support structure will encounter the workpiece periphery sooner than the other cutter wheel so that, if both cutter wheels are maintained at precisely the same radial distance from the centerline of the workpiece, loading of the one cutter wheel will greatly exceed loading applied to the other cutter wheel with a resultant unbalanced stress being applied to one of the cutter wheels and its associated support structure as compared with the other cutter wheel and its support structure.

It is highly desirable to provide an arrangement whereby such eccentric loading can be avoided on diametrically opposed cutter wheels and their associated support structure whereby stresses applied to both cutter wheels may be equalized even if the workpiece is slightly out-of-round.

The present invention has for its principal objective a compensating arrangement for roller cutters used for cutting workpieces that might be slightly out-of-round without imposing substantial eccentric stresses on the opposed cutter wheels.

SUMMARY OF THE INVENTION

The present invention provides a roller cutter module including multiple opposed cutter wheels for use in cutting tubular workpieces and which incorporates a cutter wheel support and an advancing arrangement that functions to equalize the cutting forces reacted against the cutting wheels by an out-of-round workpiece while systematically advancing the cutter wheels in and around a workpiece during a cutting operation.

Specifically, a pair of opposed cutter wheels are pivotally mounted through respective support arms to a cutter module support plate. An actuator element, carried by the cutter module support plate and pivotally connected to the cutter wheels through a linkage assembly, is provided for radially shifting the cutter wheels. The actuator element is permitted to shift towards and away form the support arms for the cutter wheels so as to equalize the cutting forces applied by each of the cutting wheels on the workpiece.

The present invention also provides a roller cutter module that is particularly adapted for use in a portable lathe type machine tool and which includes multiple cutter wheels that are permitted to float axially relative to a frame portion of the tool when cutting a workpiece.

Additional features and advantages of the roller cutter module arrangement of the present invention will become more readily apparent from the following detailed description of a preferred embodiment thereof when taken in conjunction with the following drawings wherein like reference numerals refer to corresponding parts in the several views.

BRIEF DESCRIPTION OF THE DRAWINGS

FIG. 5 is a front view of the roller cutter module similar to FIG. 1, with the cutter wheels of the module partially fed into the workpiece.

DETAILED DESCRIPTION OF THE PREFERRED EMBODIMENT

Figure 1:
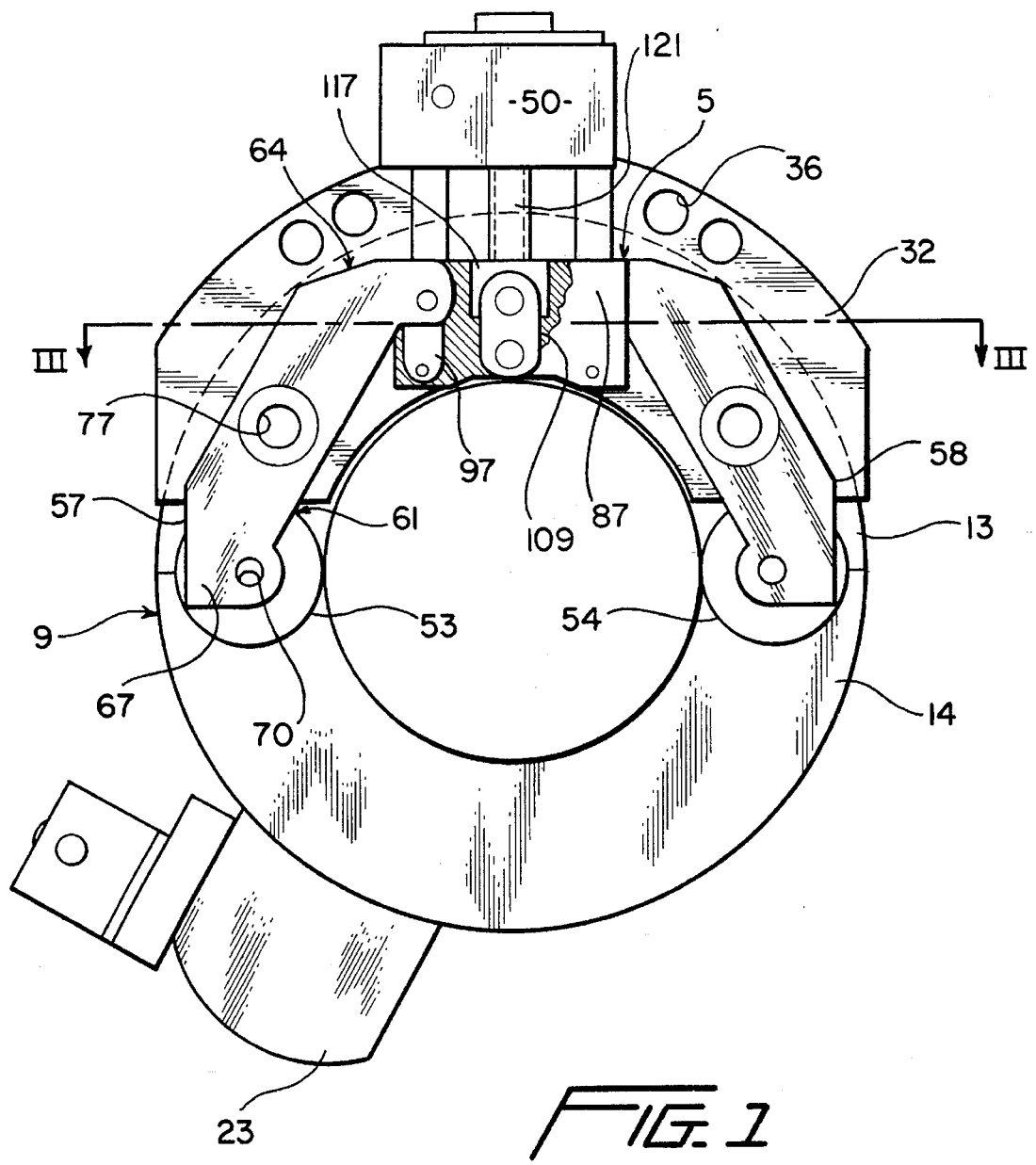
FIG. 1 is a schematic front view of the roller cutter module of the invention mounted to the rotary head of a portable lathe type machine tool.

As depicted in the drawings, the cutter module of the present invention is generally indicated at 5. In the preferred embodiment illustrated, cutter module 5 is particularly adapted to be secured to the rotary tool carrier head of a portable lathe type tool 9. However, it should be understood that cutter module 5 could be used with manual as well as power driven cutting tools. Lathe 9 includes split frame sections 13 and 14 which are adapted to be placed about a workpiece 16 (FIG. 4) and secured thereto by means of fasteners (not shown) that interconnect split frame sections 13 and 14. U.S. Pat. No. 4,829,860 owned in common with this invention illustrates such a portable lathe tool. Rotatably mounted to split frame sections 13 and 14 is a tool carrier 18. Since the specific manner in which tool carrier 18 is mounted to split frame sections 13 and 14 and rotated, such as by a drive unit 23 secured to split frame section 14, is widely known in the art of portable lathes, these details do not constitute part of this invention and therefore they are not discussed in detail herein.

Figure 2:
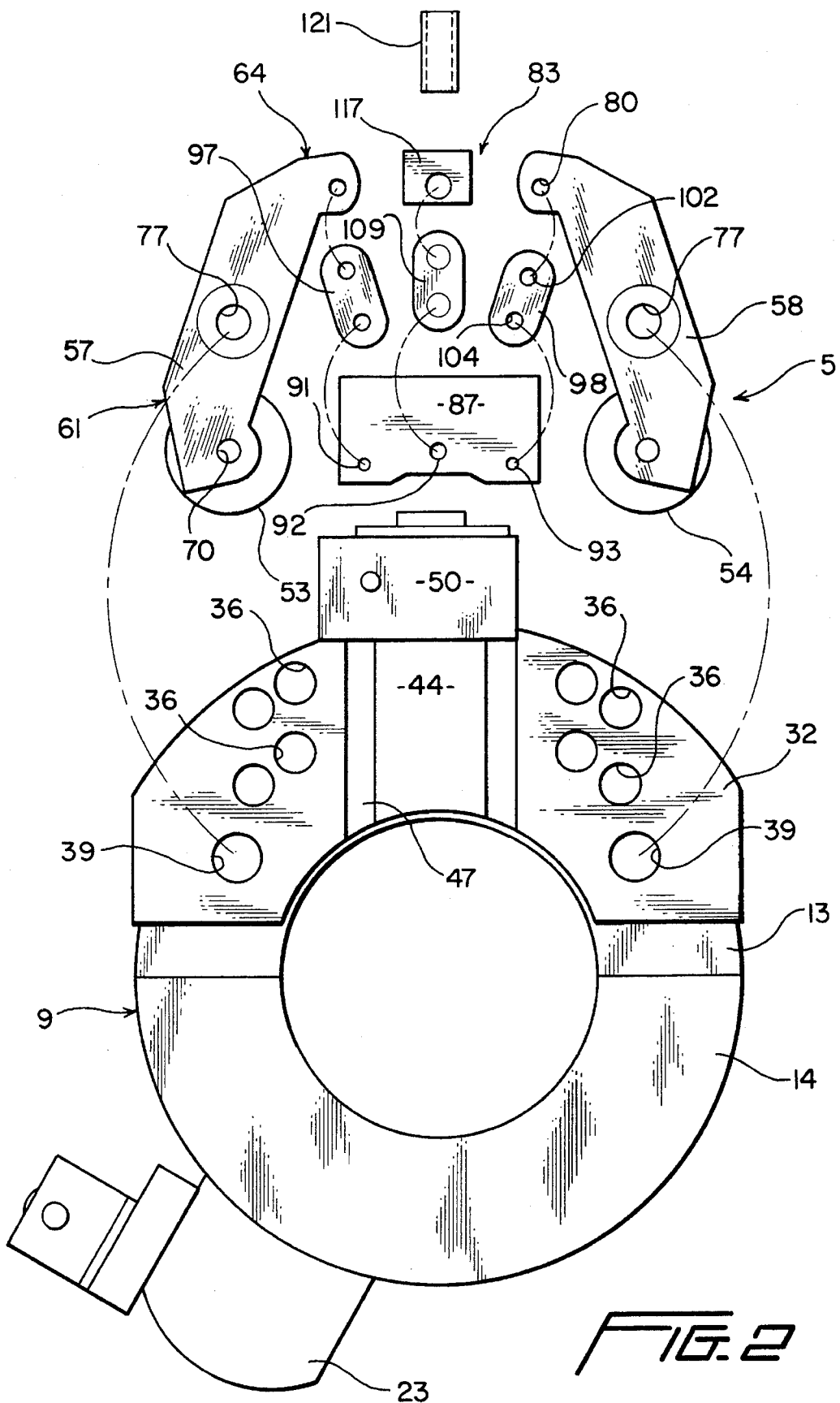
FIG. 2 is an exploded view of the components incorporated in the roller cutter module shown in FIG. 1.
Figure 3:
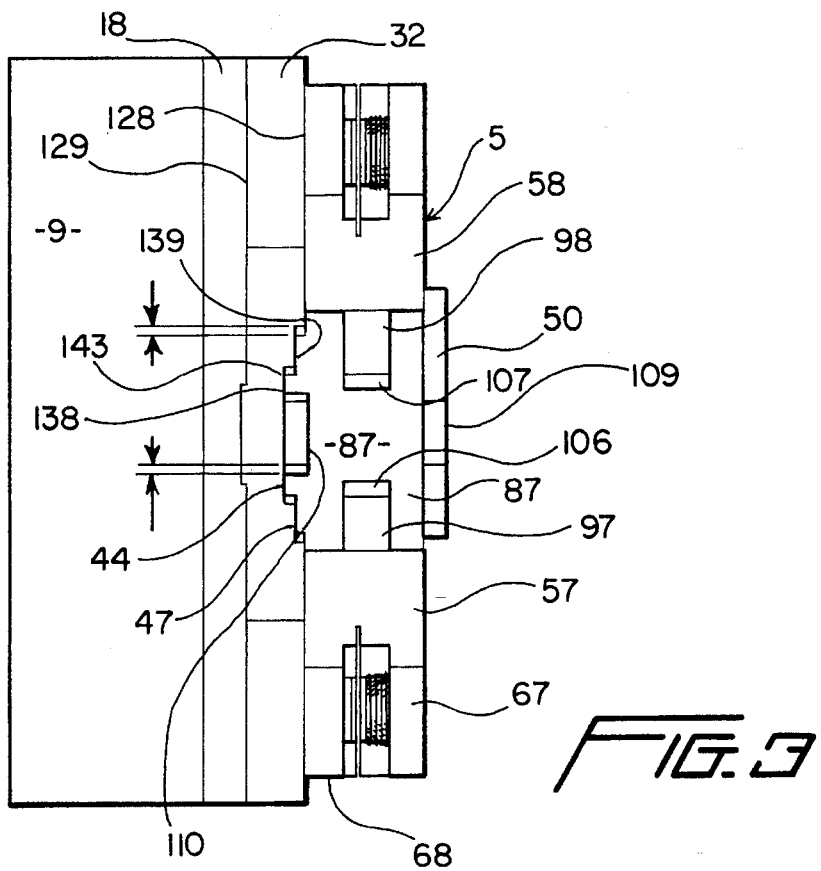
FIG. 3 is a cross-sectional view taken along line III—III of FIG. 1.

Roller cutter module 5 includes a cutter module support plate 32 that is provided with a plurality of mounting apertures 36 and a set of attachment holes 39. Mounting apertures 36 are adapted to be used to attach roller cutter module 5 to tool carrier 18 in a manner known in the art. Cutter module support plate 32 is further provided with first and second grooves 44 and 47. As best shown in FIGS. 2 and 3, grooves 44 and 47 are concentric with first groove 44 extending deeper within cutter module support plate 32 than second groove 47. Cutter module support plate 32 further carries an actuating unit 50 as will be more fully discussed below.

Figure 4:
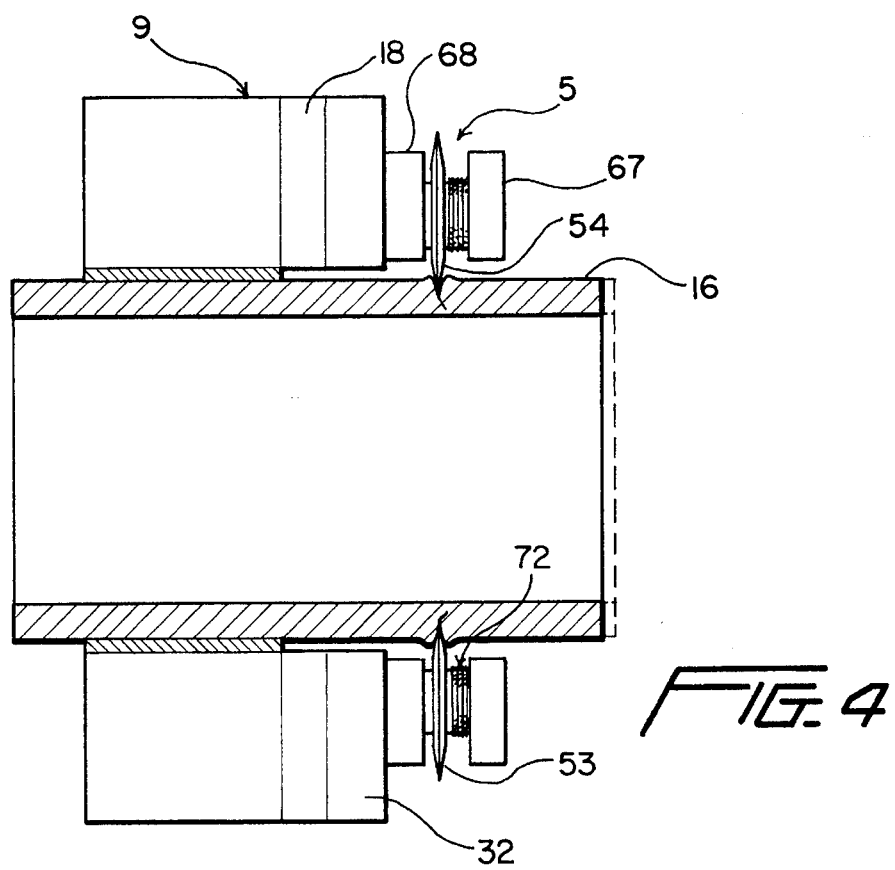
FIG. 4 is a partial cross-sectional side elevation view of the roller cutter module of FIG. 1 operating on a workpiece.

In the preferred embodiment, cutter module 5 includes a pair of cutter wheels 53 and 54 which are rotatably mounted to a pair of support arms 57 and 58. More specifically, each support arm 57, 58 includes a first or distal end 61 and a second or proximal end 64. Distal end 61 is bifurcated so as to define bifurcated first end sections 67 and 68 between which a respective cutter wheel 53, 54 is positioned. Bifurcated first end sections 67 and 68 are provided with an aligned aperture 70 for use in rotatably mounting a respective cutter wheel 53, 54 thereto. As best shown in FIG. 4, a plurality of spring washers 72 are positioned between bifurcated first end section 67 and a respective cutter wheel 53, 54 so as to bias the cutter wheel towards second end section 68.

Each support arm 57, 58 is further provided with a mounting bore 77 intermediate its proximal and distal ends 64 and 61. Mounting bore 77 is adapted to be aligned with a respective one of said attachment holes 39 in order to pivotably mount each support arm 57, 58 to cutter module support plate 32. The second end 64 of each support arm 57, 58 is further provided with a through hole 80.

Support arms 57 and 58 are adapted to be pivoted relative to cutter module support plate 32 by means of a linkage assembly generally indicated at 83 in FIG. 2. Linkage assembly 83 includes an actuator element 87 that is provided with first, second and third through holes 91, 92 and 93 respectively. Linkage assembly 83 further includes a pair of push linkages 97, 98 each of which is provided with a pair of spaced apertures 102 and 104. Aperture 102 is adapted to be aligned with through hole 80 provided in the second end 64 of one of support arms 57 and 58 to pivotally mount each push linkage 97, 98 to a respective support arm 57 and 58. In addition, aperture 104 is adapted to be aligned with a respective one of the first and third through holes 91, 93 provided in actuator element 87 for pivotally connecting push linkages 97 and 98 to actuator element 87. These connections can be accomplished by using any mechanical fasteners known in the art such as pins, screws, bolts and the like. As best shown in FIG. 3, opposing sides of actuator element 87 are formed with channels 106 and 107 within which push linkages 97 and 98 are respectively received.

Linkage assembly 83 further includes a pair of draw linkages 109 and 110 which are pivotally connected at one end thereof to second through hole 92 of actuator element 87 and to a through hole 116 provided in an actuator nut element 117 at a second end thereof. Actuator nut 117 is adapted to be threadably attached to a lead screw 121. Lead screw 121, in turn, is adapted to be rotated by actuating unit 50.

Actuating unit 50 is generally conventional in the art and therefore the details of this unit have not been shown in the drawings. For instance, as discussed in U.S. Pat. No. 4,829,860, actuating unit 50 can include a conventional star wheel that engages a fixed pin carried by one of split frame sections 13, 14 such that upon rotation of cutter module 5 by means of drive unit 23, lead screw 121 will be incrementally rotated for each revolution of cutter module 5. As best seen from comparing FIGS. 1 and 5 in the drawings, during a cutting operation, lead screw 121 is rotated in a predetermined direction so as to cause actuator nut element 117 to be shifted radially outwardly along a longitudinal axis defined by lead screw 121. Shifting of actuator nut 117 causes draw linkages 109 and 110 to be shifted as well. Since draw linkages 109 and 110 are secured to actuator element 87 through second through hole 92, actuator element 87 is also shifted relative to cutter module support plate 32. As actuator element 87 is shifted between a position shown in FIG. 1 to the position shown in FIG. 5, support arms 57 and 58 will be pivoted relative to cutter module support plate 32 due to the interconnection between support arms 57 and 58 and actuator element 87 through push linkage members 97 and 98. Pivoting of support arms 57 and 58 will thereby cause cutter wheels 53 and 54 to be fed radially inwardly in order to cut a workpiece. FIG. 4 best illustrates cutter wheels 53 and 54 penetrating a workpiece 16. Obviously, continued rotation of cutting module 5 will result in the severing of workpiece 16 at a desired location along its length.

As best illustrated in FIGS. 3 and 4, cutter module support plate 32 includes opposing surface portions 128 and 129. As previously described, surface portion 128 is provided with first and second grooves 44 and 47. Grooves 44 and 47 respectively receive tongue portions 138 and 139 constituting part of actuator element 87. Through the use of this tongue and groove interconnection between actuator element 87 and cutter module support plate 32, actuator element 87 will be guided for longitudinal movement within grooves 44 and 47 upon rotation of lead screw 121 as described above. Actuator element 87 is also provided with a longitudinally extending recess 143 adjacent surface portion 128 of cutter module support plate 32. Recess 143 accommodates draw linkage 110 as clearly shown in FIG. 3.

FIG. 3 further depicts the presence of predetermined clearances between tongue portions 138 and 139 of actuator element 87 and first and second grooves 44 and 47 of cutter module support plate 32, as well as clearances between draw linkage 110 and recess 143 of actuator element 87. These clearances extend transversely to the longitudinal direction of movement of actuator element 87 and are present throughout the entire length of tongue portions 138 and 139 within grooves 44 and 47. The presence of these clearances enables cutter wheels 53 and 54 to "float" relative to a central axis defined by workpiece 16 such that if one cutter wheel contacts workpiece 16 prior to contact of the workpiece by the second cutter wheel, the first cutter wheel will float radially outwardly relative to the workpiece centerline until actuator unit 50 advances far enough to bring both cutter wheels 53 and 54 into contact with workpiece 16. The presence of a predetermined clearance is needed to limit the degree of float freedom, since, if actuator element 87 were permitted to freely float relative to cutter module support plate 32, cutter module 5 would not finish a cut after-a partial breakthrough in workpiece 16, as the partial breakthrough would relieve the cutting pressure on one side of the cut, thereby causing the cutter wheel at the break to shift radially inwardly and the other cutter wheel to become disengaged from the workpiece.

Due to the construction of the cutter module 5 of the present invention as described above, not only does the cutter module 5 enable equalization of the cutting forces applied by cutter wheels 53 and 54 on a workpiece 16, radial forces required to force cutter wheels 53 and 54 into workpiece 16 are advantageously reacted into cutter module support plate 32 during high load cutting periods instead of being transmitted to the split frame sections 13 and 14 of the lathe 9. Lathe 9 only need provide the rotational power and reaction to radial loads associated with the torque reaction components, as well as low level radial cutting forces associated with the start and completion of cuts if workpiece 16 is excessively out-of-round. Linkage assembly 83 incorporated in cutter module 5 advantageously reduces the feed increment as cutter wheels 53 and 54 are fed radially into workpiece 16. This functions to minimize the amount of metal displaced as cutter wheels 53 and 54 progress into workpiece 16. Therefore, the energy returned to drive cutter module 5 usually associated with a constant increment feed system is compensated for.

It is also important to note that cutter wheels 53 and 54 are permitted to track the centerline of the cut being made in workpiece 16 in order to avoid breakage of the edges of cutter wheels 53 and 54, or the imposition of high stresses to the wheels and their support structure. Merely strengthening (i.e., thickening) the edges of cutting wheels 53 and 54 to make them strong enough to avoid breakage is actually a self-defeating proposition as the amount of metal displaced upon cutting of workpiece 16 would merely increase and therefore the strength requirement associated with the edges of the cutter wheels would also increase.

The incorporation of spring washers 72 between first end sections of bifurcated distal ends 61, 67 and respective cutter wheels 53 and 54 enables cutter wheels 53 and 54 to track any axial displacement of the centerline the cut. More specifically, as the cut location shifts away from the fixed axial position of split frame sections 13 and 14 of lathe 9 due to workpiece material stretching as indicated by the dotted line in FIG. 4, cutter wheels 53 and 54 will force springs 72 to compress thereby maintaining cutter wheels 53 and 54 in the transverse plane including the cut centerline.

Although disclosed with respect to a preferred embodiment of the invention wherein cutter module 5 has been incorporated in a portable lathe 9, it should be readily understood that the cutter module 5 can be incorporated in various types of machine tools without departing from the spirit of the invention. Moreover, the specific structural details described are exemplary only since suitable alternative structural configurations equivalent to the disclosed embodiment are within the purview of persons of ordinary skill in the art. For example, while the actuator illustrated and described contemplates radial movement to actuate the support arms 57, 58, an axially movable actuator element functioning in the equivalent manner to produce the same resultant movement of the support arms could be utilized, provided that the actuator was supported in a suitable manner to provide the desired "float" of the proximal ends of support arms 57 and 58. In general, the invention is only intended to be limited by the scope of the following claims.

We claim:

1. A cutter module adapted to be attached to a rotatable device for transversely cutting tubular workpieces comprising:

a cutter module support plate adapted to be fixedly secured to a rotatable device for rotation with the rotatable device about a rotation axis;

a pair of rotatable cutter wheel elements;

a pair of support arms, each of said support arms having distal and proximate ends and being pivotally connected intermediate said ends to said cutter module support plate about a respective pivot axis that is substantially parallel to said rotation axis, the distal end of each of said support arms rotatably carrying a respective one of said pair of cutter wheel elements such that said cutter wheel elements are supported on opposite sides of the rotation axis and are moved radially relative to the rotation axis upon pivoting of said support arms;

an actuator pivotally interconnected to the proximal end of each of said support arms, said actuator including a portion mounted on the support plate for movement, relative to the support plate for causing said support arms to pivot in opposite directions about their respective pivot axes, thereby radially positioning said cutter wheel elements, said actuator portion being further mounted on said support plate for movement relative to said support plate for enabling movement of the proximal ends of the support arms in response to eccentric forces applied to the cutter wheel elements by an out-of-round workpiece during workpiece cutting for effecting equalization of radial cutting forces at the cutter wheel elements.

2. The cutter module as claimed in claim 1, wherein said cutter module support plate includes axially opposed surface portions, one of said surface portions being formed with a first radial groove, said actuator portion being slidably mounted within said first radial groove.

3. The cutter module as claimed in claim 2, wherein said first radial groove has an associated chordwise dimension that provides a clearance between said cutter module support plate and said actuator portion for enabling said movement of said actuator portion in a direction to effect said equalization of curing forces at the cutter wheel elements.

4. The cutter module as claimed in claim 1, further including linkage means pivotally interconnecting said proximal ends of said support arms to said actuator.

5. The cutter module as claimed in claim 4, wherein said linkage means includes a pair of push linkages, each of which includes a first end portion pivotally attached to said actuator portion and a second end portion pivotally attached to a respective one of said proximal ends of said support arms.

6. The cutter module as claimed in claim 1, further comprising driver means for moving said actuator portion relative to said support plate.

7. The cutter module as claimed in claim 6, wherein said driver means includes a nut element attached to said actuator portion and a screw element carried by said cutter module support plate, said screw element being threadably attached to said nut element such that rotation of said screw element causes said nut element to ride upon said screw element thereby causing said actuator portion to be moved relative to said support plate.

8. The cutter module as claimed in claim 7, wherein said driver means further includes at least one draw link pivotally interconnecting said actuator portion and said nut element.

9. The cutter module as claimed in claim 1, wherein the distal end of each of said support arms is bifurcated so as to define a pair of axially spaced end sections, said cutter wheel elements being rotatably mounted between said end sections of each support arm.

10. The cutter module as claimed in claim 9, including a rotatable tool carrier head of a lathe type machine tool, and wherein said cutter module is secured to said carrier head.

11. The cutter module as claimed in claim 10, said machine tool including a split frame and a carrier head adapted to be opened for installation about a tubular axially extending workpiece, and wherein said cutter module is mounted to one half portion of said split carrier head.

12. The cutter module as claimed in claim 9, further including spring elements positioned between each said cutter wheel element and one side of the bifurcated end of a respective support arm, said spring elements arranged to bias the cutter wheel elements axially towards the support plate.

* * * * *